April 9, 1929. W. J. ANDRES 1,708,168
BRAKE OPERATING CONNECTION
Filed July 25, 1925 2 Sheets-Sheet 1
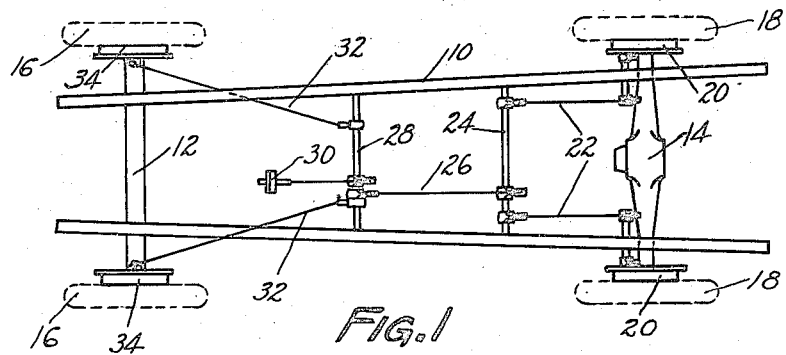
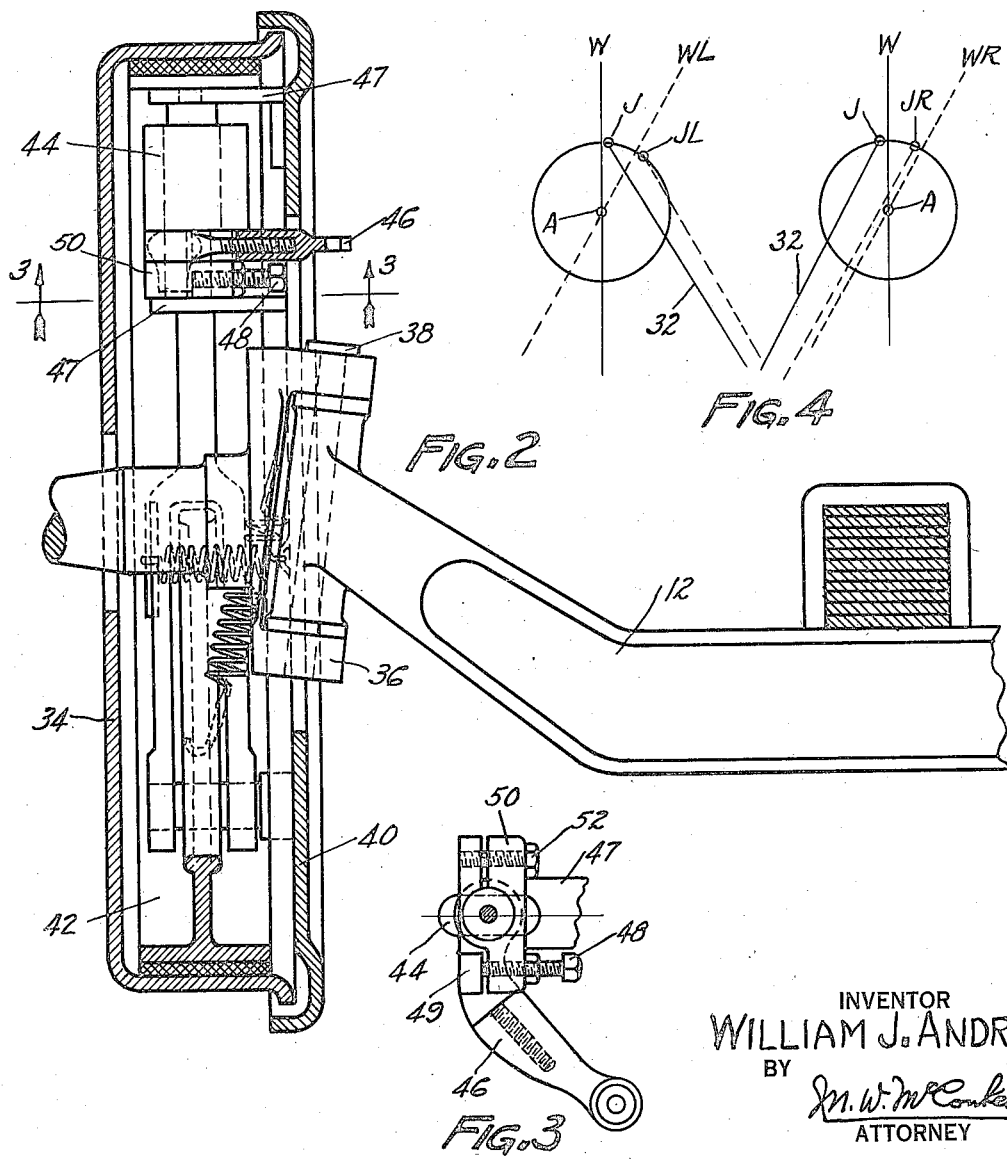
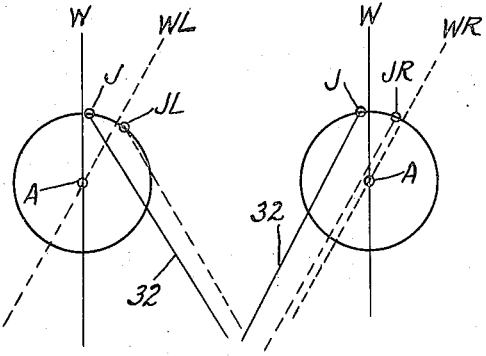
INVENTOR
WILLIAM J. ANDRES
BY
ATTORNEY April 9, 1929.   W. J. ANDRES   1,708,168
BRAKE OPERATING CONNECTION
Filed July 25, 1925   2 Sheets-Sheet 2
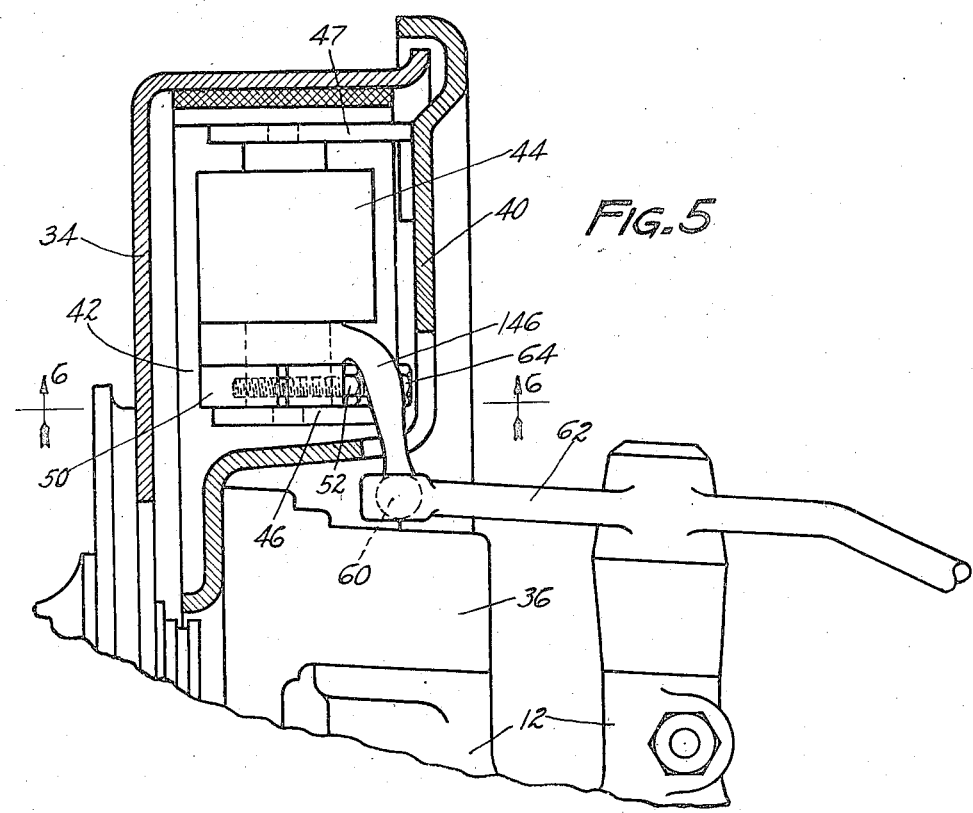
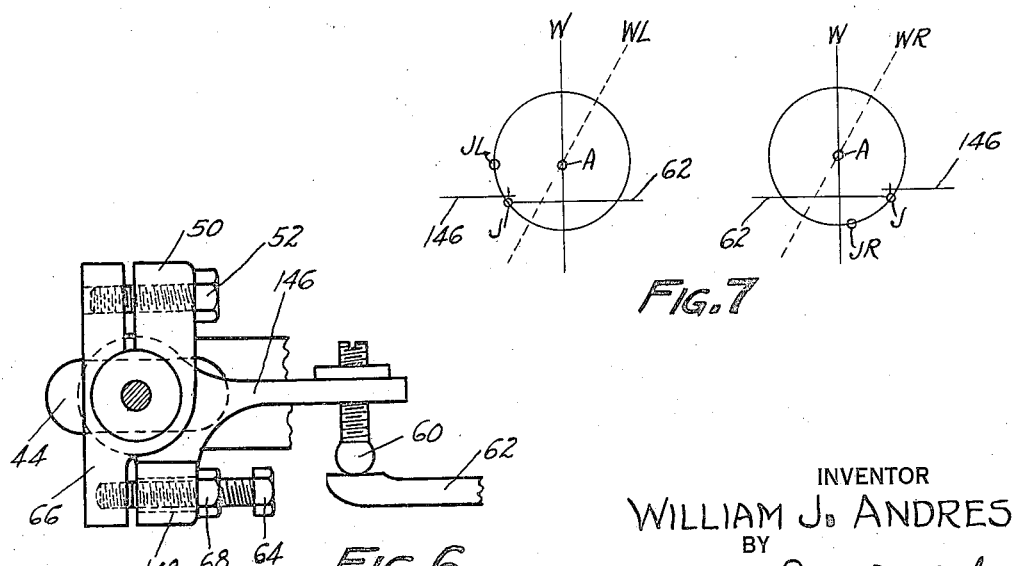
INVENTOR
WILLIAM J. ANDRES
BY
*M. W. McConkey*
ATTORNEY Patented Apr. 9, 1929.

1,708,168

UNITED STATES PATENT OFFICE.

WILLIAM J. ANDRES, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING CONNECTION.

Application filed July 25, 1925. Serial No. 46,040.

This invention relates to brakes, and is illustrated as embodied in an automobile chassis. An object of the invention is to provide for adjustment of operating connections arranged to vary the pressure on the brakes when the wheels are swivelled. While either adjustment is capable of independent use, I prefer to provide, first, for adjustment of the amount of variation in braking pressure caused by swivelling the wheel through a definite angle, and, second, for adjustment of the ratio between the relief of the pressure on one brake and the increase of pressure on the other.

The above and other objects and features of the invention, including a novel arrangement of the parts of a "crank-and-lever" control, and other new combinations of parts and desirable particular constructions, will be apparent from the following description of two illustrative embodiments shown in the accompanying drawings, in which:

Fig. 1 is a top plan view of an automobile chassis embodying one modification;

Fig. 2 is a vertical section through one front brake and associated parts;

Fig. 3 is a section on the line 3—3 of Fig. 2, showing the operating arm in bottom plan;

Fig. 4 is a diagram of the action on a turn, and corresponding to a top plan view of the two front wheels;

Fig. 5 is a vertical section corresponding to the upper part of Fig. 2, but showing the second modification;

Fig. 6 is a section on the line 6—6 of Fig. 5, and corresponding to Fig. 3; and

Fig. 7 is a diagram of the action of the second modification.

The chassis shown in Fig. 1 includes a frame 10 carried by axles 12 and 14 supported on the front and rear wheels 16 and 18. The rear brakes 20 are operated by brake rods 22 from a shaft 24, which in turn is linked by a rod 26 to a shaft 28 rocked by pedal 30. Shaft 28 directly operates the cables or rods or other tension members 32 extending to the front brakes.

Each front brake is shown as including a drum 34 rotating with the wheel, the wheel 16 being rotatably mounted on a knuckle 36 swivelled by a king-pin 38 at one end of the axle 12. Each knuckle 36 also carries a stationary support such as a backing plate 40. Between the drum 34 and backing plate 40 are arranged the brake shoes 42 expanded in applying the brake by a double cam 44 mounted with vertical spindle ends to rock about a vertical axis, and carried by a braket 47 secured in any desired manner to the backing plate 40.

Except as further described below, the above-listed parts or their equivalents may be of any desired construction.

In the arrangement of Figs. 1–4, each tension member 32 is connected by a suitable joint directly to a substantially horizontal arm 46,—i. e., an arm swinging about a vertical axis,—freely sleeved on a cylindrical part of cam 44, and having a downwardly-projecting lug 49 (Fig. 3) engaged by an adjusting screw 48 threaded through a part of a split block 50 clamped by a screw 52 on the said cylindrical part of cam 44. It should be noted that arm 46 is in two parts threaded together, so that it is adjustable for length. It will be apparent that the joint between arm 46 and member 32 can thus be adjusted lengthwise of the arm, and can also be adjusted angularly about the cam axis.

Fig. 4 illustrates the operation of the connections on a turn. In this diagram, the axes of king-pins 38 (the swivelling axes) are indicated at A, and the lines W are parallel to the two wheels when moving straight ahead, the actual positions of the wheels being too far outside the swivelling axes to show on the large scale of this diagram. The joints between members 32 and arms 46 are shown at J.

If now the wheels are swivelled to new positions parallel respectively to line WL, WR, to round a corner to the right, joints J are swung respectively to JL and JR, on arcs of circles whose centers are in the axes A. It will be seen that arc J—JL has a substantial component in the direction of tension on member 32, and thus the pressure on the outer brake is relieved, whereas arc J—JR is more nearly at a right angle to its member 32 and thus there is only a very small increase in pressure on the inner brake.

If points J were selected at such positions on the circles that members 32 were tangent to the circles, the increase in pressure on the inner brake would be exactly equal to the relief in pressure on the outer brake (except as the inner wheel usually swivels a few degrees more than the outer wheel). On the other hand, if members 32 passed through axes A diametrically of the circles to reach joints J, swivelling the wheels in either direction would slightly relieve the pressure on both brakes.

The purpose of the above-described adjustments will now be apparent. By suitable adjustment, points J may be selected anywhere on the circumferences of the circles between the points of tangency and the points in line with the axes A, thus varying the ratio between the relief on the outer brake and the increase in pressure on the inner brake. The positions illustrated, approximately midway between the two extremes, represent a suitable compromise.

Also, by suitable adjustment, the diameters of the circles can be changed, thus changing the amount of relief (or increase) in pressure caused by swivelling the wheels through a definite angle. By bringing joints J into the axes A, differential action can be eliminated entirely.

In the modification of Figs. 5–7, the two-piece brake-applying arm 146 is spaced rearwardly of the swivelling axis, instead of forwardly thereof, as in the case of arm 46, and at its end carries a threaded adjustable member 60 locked by a suitable nut and having a ball end engaged by a plane surface on the end of a horizontal lever 62 fulcrumed on the axle 12.

The arm 146 may have a lug engaged by an adjusting screw as described above, or, as shown in Fig. 6, the lug 148 on the lever may have an opening loosely sleeved on a screw 64 threaded into a part 66 of the clamp block 50. An adjustable nut 68 on screw 64 is engaged by lug 148 of the lever when the brake is applied, a suitable locknut being provided if desired. The adjustment of this modification will readily be understood from the above description of the first modification.

Referring to Fig. 7, when the wheels are swivelled to the right, the joints J between levers 62 and arms 146 tend to move respectively to JL and JR. Therefore the outer arm 146 moves away from its lever 62, to relieve the pressure on the brake, whereas the inner arm 146 crowds against its arm 62 to increase the pressure on the brake.

If joints J were exactly opposite axes A, so that the lines representing levers 62 would pass through these axes diametrically of the circles, the increase in pressure on the inner brake would equal the relief in pressure on the outer brake. If joints J were at the bottoms of the circles there would be a slight decrease in pressure on both brakes. The compromise positions illustrated are approximately midway between the two extremes, and represent an arrangement securing a substantial relief in pressure on the outer brake with a very small increase in pressure on the inner brake.

While two illustrative embodiments of my invention have been described in detail, it is not my intention to limit its scope to those particular embodiments, or otherwise than by the terms of the appended claims.

I claim:

1. A swivelled wheel having a brake, in combination with operating connections for the brake including a joint so constructed and so arranged with respect to the swivelling axis as to vary the pressure on the brake automatically when the wheel is swivelled, and adjusting means to change the arrangement of the joint in such a manner as to increase or decrease at will the amount of variation in braking pressure caused by swivelling the wheel through a definite angle.

2. A swivelled wheel having a brake, in combination with operating connections for the brake including a joint so constructed and so arranged with respect to the swivelling axis as to relieve the pressure on the brake automatically when the wheel is swivelled, to place it on the outer side of a turn, and adjusting means to change the arrangement of the joint in such a manner as to increase or decrease at will the amount or relief in braking pressure caused by swivelling the wheel through a definite angle.

3. A swivelled wheel having a brake, in combination with operating connections for the brake including a joint moved in applying the brake from an idle position spaced from the swivelling axis to an active position slightly at one side of that axis, and so arranged with respect to that axis that swivelling the wheel varies the pressure on the brake, and adjusting means for changing the active position of the joint with respect to the swivelling axis.

4. A swivelled wheel having a brake, in combination with operating connections for the brake including a joint moved in applying the brake from an idle position spaced from the swivelling axis to an active position slightly at one side of that axis and so arranged with respect to that axis that swivelling the wheel to place it on the outer side of a turn relieves the pressure on the brake, and adjusting means for changing the active position of the joint with respect to the swivelling axis.

5. A vehicle having two swivelled wheels each having a brake, in combination with operating connections for the brakes so arranged that swivelling the wheels relieves the pressure on one brake and increases the pressure on the other, together with adjusting means for varying the ratio of the relief to the increase.

6. A vehicle having two swivelled wheels each having a brake, in combination with operating connections for the brakes so arranged that swivelling the wheels relieves the pressure on the outer brake and increases the pressure on the inner brake, together with adjusting means for varying the ratio of the pressure on the two brakes when the wheels are swivelled through a definite angle.

7. A vehicle having two swivelled wheels, each having a brake, in combination with operating connections for the brakes including a joint for each brake so arranged with respect to the corresponding axis that swivelling the wheels relieves the pressure on one brake and increases the pressure on the other, together with means for adjusting the positions of the joints with respect to the swivelling axes to vary the ratio of relief to increase.

8. A vehicle having two swivelled wheels, each having a brake, in combination with operating connections for the brakes including a joint for each brake movable in applying the brake from a position spaced from the corresponding axis to an active position slightly at one side thereof so that swivelling the wheels relieves the pressure on the outer brake and increases the pressure on the inner brake, together with means for adjusting the active positions of the joints with respect to the swivelling axes to vary the ratio of relief to increase.

9. A swivelled wheel having a brake, in combination with operating connections for the brake including a joint arranged when the brake is applied slightly at one side of the swivelling axis and swung in a circle about said axis to vary the pressure on the brake when the wheel is swivelled, and adjusting means for changing the diameter of the circle.

10. A swivelled wheel having a brake, in combination with operating connections for the brake including a joint arranged when the brake is applied slightly at one side of the swivelling axis and swung in a circle about said axis to vary the pressure on the brake when the wheel is swivelled, and adjusting means for changing the position of the joint on the circumference of the circle.

11. A swivelled wheel having a brake, in combination with an operating arm movable in a horizontal plane for the brake swivelling with the wheel and swung in applying the brake about a vertical axis to move a part horizontally from an idle position spaced from the swivelling axis to an active position substantially in that axis, and a lever not swivelling with the wheel and engaging said part to swing the arm to apply the brake.

12. A swivelled wheel having a brake, in combination with an operating arm for the brake swivelling with the wheel and swung in applying the brake about a vertical axis to move a part horizontally from an idle position spaced rearwardly from the swivelling axis forwardly to an active position substantially in that axis, and a generally horizontal lever not swivelling with the wheel and fulcrumed to swing about a vertical axis and engaging said part to swing the arm to apply the brake.

13. A swivelled wheel having a brake, in combination with an operating arm movable in a horizontal plane for the brake swivelling with the wheel and swung in applying the brake about a vertical axis to move a part horizontally from an idle position spaced from the swivelling axis to an active position substantially in that axis, a lever not swivelling with the wheel and engaging said part to swing the arm to apply the brake, and means for adjusting the position of the joint between said lever and said part.

14. A swivelled wheel having a brake, in combination with operating connections including a joint so arranged with respect to the swivelling axis as to vary the pressure on the brake when the wheel is swivelled, and means for adjusting the position of the joint in such a manner that there is no variation in pressure on the brake when the wheel is swivelled.

15. A swivelled wheel having a brake, in combination with operating connections including a joint arranged when the brake is applied, slightly at one side of the swivelling axis, so that swivelling the wheel varies the pressure on the brake, together with adjusting means for shifting the joint into the swivelling axis, to eliminate the variation.

16. Operating means for a brake on a swivelled wheel including two levers having interengaging parts forming a joint moved crosswise of the swiveling axis in applying the brake, one of said parts being threaded in its lever for adjusting the joint with respect to said axis.

17. Operating means for a brake on a swivelled wheel including two levers having interengaging parts forming a joint moved crosswise of the swiveling axis in applying the brake, one of said parts including a rounded portion in thrust engagement with the other part and having its center adjacent the swiveling axis when the brake is applied, and one of said parts being threaded in its lever for adjusting the applied position of said center with respect to said axis.

18. Operating means for a brake on a swivelled wheel, including a lever swiveling with the wheel and having at its movable end a part adjustably movable toward the swiveling axis, and a lever fulcrumed between its ends independently of the wheel and having at its end a part swinging crosswise of the swiveling axis and engaging said adjustable part.

19. Operating means for a brake on a swivelled wheel, including a lever swiveling with the wheel and having a thrust part threaded crosswise of its end, and a lever fulcrumed between its ends independently of the wheel and having at its end a part swinging crosswise of the swiveling axis and engaging said thrust part.

In testimony whereof I have hereunto signed my name.

WILLIAM J. ANDRES.

DISCLAIMER 1,708,168.—*William J. Andres*, South Bend, Ind. BRAKE-OPERATING CONNECTION. Patent dated April 9, 1929. Disclaimer filed October 17, 1938, by the assignee, *Bendix Brake Company*.

Hereby enters this disclaimer of claims 1 and 2 of said patent.

[*Official Gazette November 8, 1938.*]